(12) United States Patent
Alexander et al.

(10) Patent No.: US 8,004,140 B2
(45) Date of Patent: Aug. 23, 2011

(54) DOVETAIL SPOKE INTERNAL PERMANENT MAGNET MACHINE

(75) Inventors: James Pellegrino Alexander, Ballston Lake, NY (US); Ayman Mohamed Fawzi EL-Refaie, Niskayuna, NY (US); Murtuza Lokhandwalla, Clifton Park, NY (US); Manoj Ramprasad Shah, Latham, NY (US); Jeremy Daniel VanDam, West Coxsackie, NY (US)

(73) Assignee: General Electric Company, Niskayuna, NY (US)

( * ) Notice: Subject to any disclaimer, the term of this patent is extended or adjusted under 35 U.S.C. 154(b) by 133 days.

(21) Appl. No.: 12/432,894

(22) Filed: Apr. 30, 2009

(65) Prior Publication Data
US 2010/0277017 A1 Nov. 4, 2010

(51) Int. Cl.
*H02K 21/12* (2006.01)
*H02K 1/06* (2006.01)

(52) U.S. Cl. ......... 310/156.56; 310/156.48; 310/156.57; 310/216.057; 310/216.074

(58) Field of Classification Search .............. 310/60 A, 310/156.11, 156.48–156.59, 216.007, 216.053, 310/216.057–216.058, 216.074, 216.079
See application file for complete search history.

(56) References Cited

U.S. PATENT DOCUMENTS

| | | | |
|---|---|---|---|
| 1,581,876 A | | 4/1926 | Samson |
| 3,979,821 A | * | 9/1976 | Noodleman ............ 29/598 |
| 4,354,126 A | * | 10/1982 | Yates ............ 310/156.59 |
| 4,445,062 A | * | 4/1984 | Glaser ............ 310/156.59 |
| 4,588,914 A | * | 5/1986 | Heyne ............ 310/156.11 |
| 6,191,511 B1 | * | 2/2001 | Zysset ............ 310/60 A |
| 6,288,467 B1 | * | 9/2001 | Lange et al. ............ 310/156.58 |

(Continued)

FOREIGN PATENT DOCUMENTS
EP 0959549 A1 11/1999
(Continued)

OTHER PUBLICATIONS

Jere Kolehmainen; "Machine With a Rotor Structure Supported Only by Buried Magnets"; ISEF 2007-XIII International Symposium on Electromagnetic Fields in Mechatronics, Electrical and Electronic Engineering; Prague; Sep. 2007. (6 Pages).

(Continued)

*Primary Examiner* — Burton Mullins
*Assistant Examiner* — Jose A Gonzalez Quinones
(74) *Attorney, Agent, or Firm* — Joseph J. Christian

(57) ABSTRACT

An internal permanent magnet (IPM) machine is provided. The IPM machine includes a stator assembly and a stator core. The stator core also includes multiple stator teeth. The stator assembly is further configured with stator windings to generate a stator magnetic field when excited with alternating currents and extends along a longitudinal axis with an inner surface defining a cavity. The IPM machine also includes a rotor assembly and a rotor core. The rotor core is disposed inside the cavity and configured to rotate about the longitudinal axis. The rotor assembly further includes a shaft. The shaft further includes multiple protrusions alternately arranged relative to multiple bottom structures provided on the shaft. The rotor assembly also includes multiple stacks of laminations disposed on the protrusions and dovetailed circumferentially around the shaft. The rotor assembly further includes multiple pair of permanent magnets for generating a magnetic field, which magnetic field interacts with the stator magnetic field to produce a torque. The multiple pair of permanent magnets are disposed between the stacks. The rotor assembly also includes multiple middle wedges mounted between each pair of the multiple permanent magnets.

14 Claims, 8 Drawing Sheets

U.S. PATENT DOCUMENTS 6,911,756 B1 * 6/2005 Chang .................. 310/156.01
6,967,420 B2 * 11/2005 Laurent et al. .......... 310/156.51
7,205,695 B2 * 4/2007 Smith .................. 310/216.004

FOREIGN PATENT DOCUMENTS

EP  1251624 A2  10/2002
JP  2008136320 A  6/2008

OTHER PUBLICATIONS

Ray M. Calfo, Matt B. Smith, and John E. Tessaro; "High-Speed Generators for Power-Dense, Medium-Power, Gas Turbine Generator Sets"; Naval Engineers Journal vol. 119 Issue 2, pp. 63-81; Published Online: Nov. 14, 2007.

* cited by examiner

DOVETAIL SPOKE INTERNAL PERMANENT MAGNET MACHINE

STATEMENT REGARDING FEDERALLY SPONSORED RESEARCH & DEVELOPMENT

This invention was made with Government support under contract number DE-FC26-07NT43122 awarded by U.S. Department of Energy. The Government has certain rights in the invention.

CROSS REFERENCE TO RELATED APPLICATIONS

This application is related to the following co-pending U.S. patent application Ser. No. 12/432,885, entitled "High Speed Internal Permanent Magnet Machine" assigned to the same assignee as this application and being filed herewith, the entirety of which is hereby incorporated by reference herein.

BACKGROUND

The invention relates generally to an internal permanent magnet machine and more particularly, to a high-speed internal permanent magnet machine with high power-density.

Internal Permanent Magnet (IPM) Machines such as IPM motors or generators have been widely used in a variety of applications including aircraft, automobiles and industrial usage. However, IPM machines are currently the clear favorite in hybrid automotive applications. Therefore, a requirement for lightweight and high power density IPM machines has resulted in the design of higher speed motors and generators to maximize the power to weight ratios. Hence, the trend is increasing acceptance of IPM machines offering high machine speed, high power density, reduced mass and cost. In a conventional IPM machine, multiple permanent magnets are embedded inside multiple laminations of a rotor. The mechanical stresses in the rotor are concentrated in multiple bridges and center posts. For higher speed applications, the thickness of the multiple bridges and center posts have to be increased for enhanced structural strength of the rotor and various other parts. The increased thickness leads to more magnet flux leakage into the multiple bridges and center posts, which leakage significantly reduces the machine power density, resulting in decreased efficiency of the machine.

Therefore, it is desirable to have a high-speed IPM machine with high power density and efficiency.

BRIEF DESCRIPTION

In accordance with an embodiment, an IPM machine is provided. The IPM machine includes a stator assembly and a stator core. The stator core also includes multiple stator teeth. The stator assembly is further configured with stator windings to generate a stator magnetic field when excited with alternating currents and extends along a longitudinal axis with an inner surface defining a cavity. The IPM machine also includes a rotor assembly and a rotor core. The rotor core is disposed inside the cavity and configured to rotate about the longitudinal axis. The rotor assembly further includes a shaft. The shaft further includes multiple protrusions alternately arranged relative to multiple bottom structures provided on the shaft. The rotor assembly also includes multiple stacks of laminations disposed on the protrusions and dovetailed circumferentially around the shaft. The rotor assembly further includes multiple pair of permanent magnets for generating a magnetic field, which magnetic field interacts with the stator magnetic field to produce a torque. The multiple pair of permanent magnets are disposed between the stacks. The rotor assembly also includes multiple middle wedges mounted between each pair of the multiple permanent magnets.

In accordance with an exemplary embodiment, a method for assembling an IPM machine is provided. The method includes providing a stator assembly including a stator core with multiple stator teeth. The method includes providing the stator assembly extending along a longitudinal axis with an inner surface defining a cavity and configured with stator windings to generate a stator magnetic field when excited with alternating currents. The method also includes providing a rotor assembly with a rotor core disposed inside the cavity and configured to rotate about the longitudinal axis. The method includes providing a shaft with multiple protrusions alternately arranged relative to multiple bottom structures around the shaft. The method further includes providing multiple stacks of laminations disposed on the protrusions and dovetailed circumferentially around the shaft. In accordance with yet another embodiment, the method includes providing multiple pair of permanent magnets disposed between the stacks and configured to generate a magnetic field, which magnetic field interacts with the stator magnetic field to produce a torque. In yet another embodiment, the method includes providing middle wedges between each pair of permanent magnets. The method also includes providing multiple top wedges mounted on the multiple permanent magnets for containing the multiple permanent magnets.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the invention are directed towards an IPM machine and a method for providing the same. The IPM machine includes a stack of laminations preferably shaped in a dovetail configuration for engagement with multiple permanent magnets, which laminations are mounted in multiple protrusions circumferentially around a shaft in a rotor assembly. As used herein, the term 'dovetail' refers to fan-shaped features that form a tight interlocking joint. In particular, the present invention is directed to a high-speed IPM machine with high power-density ranging between about 1.375 kWpeak/Kg to about 1.57 kWpeak/Kg.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Figure 1:
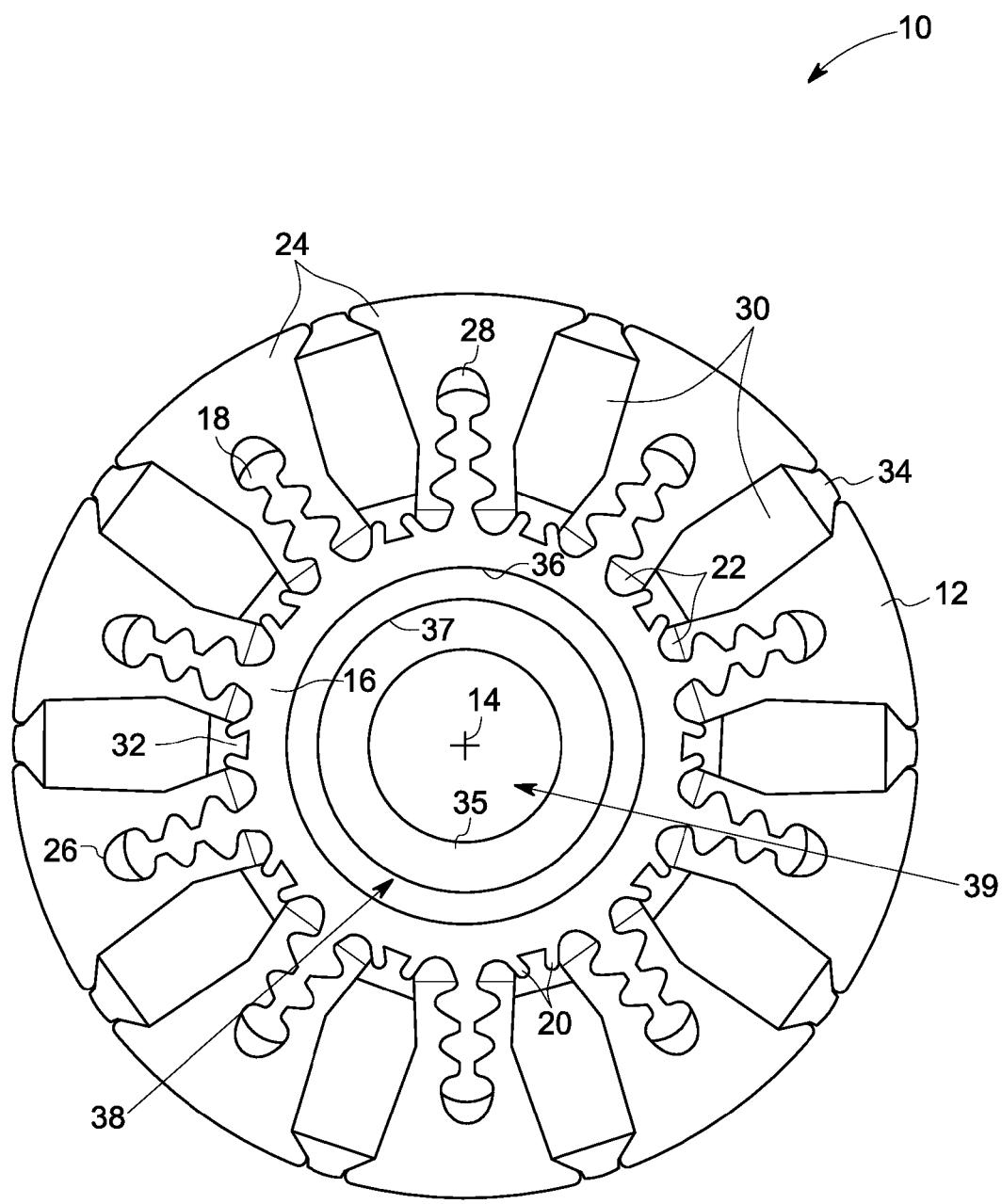
FIG. 1 is a cross-sectional view of a rotor assembly of an IPM machine in accordance with an exemplary embodiment of the invention.

FIG. 1 illustrates a cross-sectional view of a rotor assembly 10 of an IPM machine. The rotor assembly 10 includes a rotor core 12. The rotor core 12 is configured to rotate about a longitudinal axis 14, of the IPM machine. The rotor assembly 10 further includes a shaft 16 with multiple protrusions 18 around the rotor core 12. In the illustrated embodiment, the shaft 16 also includes multiple bottom features 20 alternatively arranged relative to the multiple protrusions 18. In a particular embodiment, the bottom structures 20 are configured to provide passages 22 for a cooling fluid (not shown) within the rotor core 12. In a non-limiting example, the cooling fluid through the passages 22 may be airflow or a coolant for reducing mechanical stresses and eddy current losses in the rotor assembly 10. The rotor assembly 10 also includes multiple stacks of laminations 24 disposed on the protrusions 18 and dovetailed circumferentially around the shaft 16. In one embodiment, the stacks of laminations 24 and the protrusions 18 of the shaft 16 are configured to provide multiple shaft top features 26 with spaces 28 for allowing flow of a cooling fluid. In other embodiments, the shaft top features 26 may reduce mechanical stresses and eddy current losses of the rotor assembly 10. Inclusion of the shaft top features 26 may further result in overall mass reduction of the rotor assembly 10.

Figure 2:
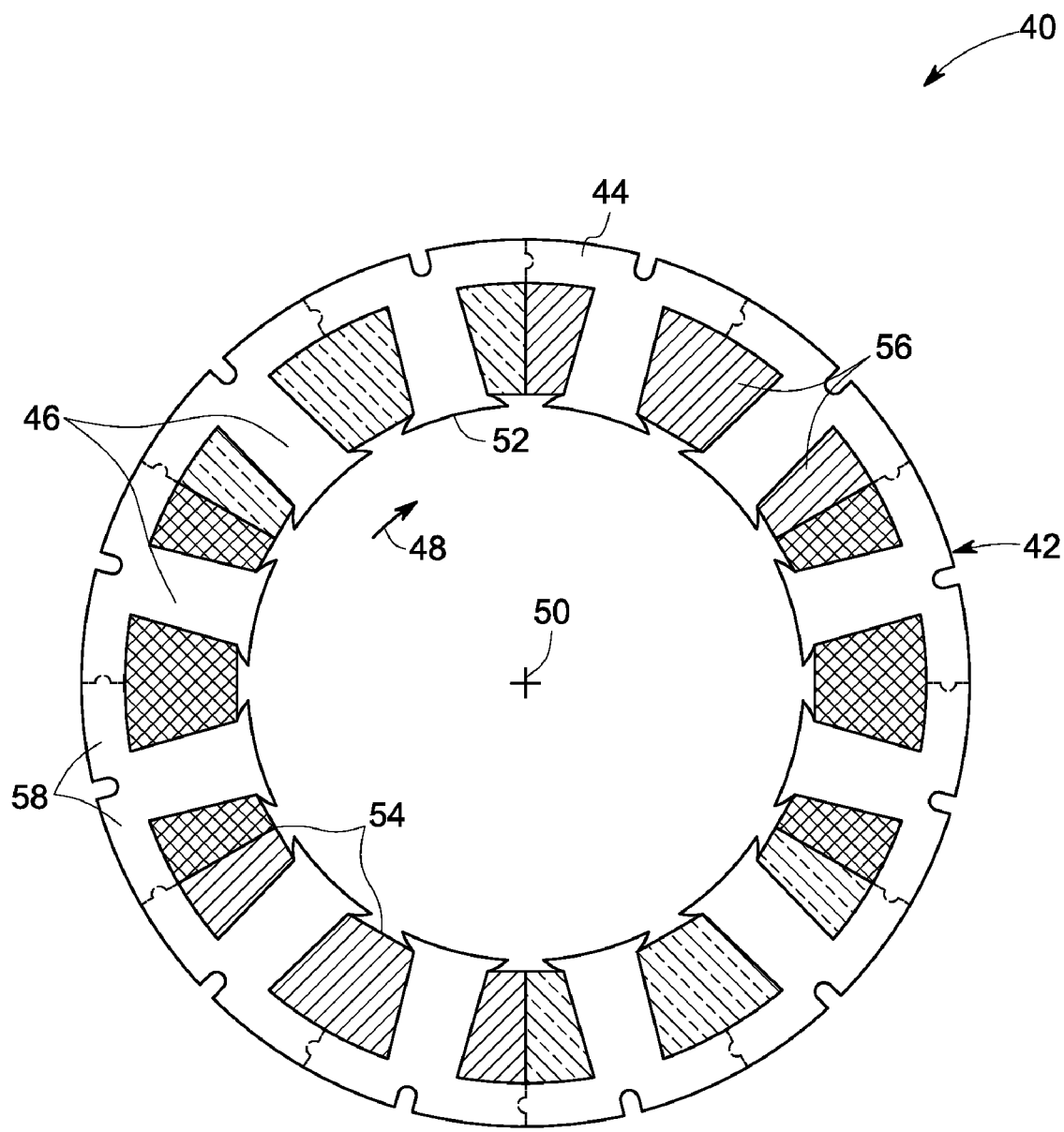
FIG. 2 is a cross-sectional view of a stator assembly of an IPM machine in accordance with an exemplary embodiment of the invention.

Furthermore, the rotor assembly 10 includes multiple permanent magnets 30 disposed between the stacks of laminations 24 within the rotor core 12. The permanent magnets 30 generate a magnetic field to be radially directed in an air gap between the rotor assembly 10 and a stator (FIG. 2). The magnetic field generated by the permanent magnets 30 further interacts with a stator magnetic field to produce a torque. The permanent magnets 30 provide an arrangement, which is a dovetail spoke configuration, particularly well suited for high-speed applications. The dovetail spoke configuration provides for superior magnetic flux-concentration effects, thereby enhancing the machine power density.

In one embodiment, the permanent magnets 30 may be made of neodymium-boron-iron. In another embodiment, the permanent magnets 30 are made of samarium-cobalt, or ferrite, or Alnico. The rotor assembly 10 also includes multiple bottom wedges 32 disposed on the bottom structures 20 of the shaft 16. The multiple bottom wedges 32 are arranged to hold the multiple stacks of laminations 24 and the multiple permanent magnets 30 in the rotor assembly and further prevents from splaying during high-speed rotations. In one embodiment, the bottom wedges 32 are non-metallic wedges for reducing the eddy current losses in the rotor core 12. In a particular embodiment, the rotor assembly 10 is also provided with multiple top wedges 34 covering the outer periphery of the rotor assembly 10 to prevent the permanent magnets 30 from splaying due to a centrifugal force generated in the high-speed rotor core 12.

Furthermore, the rotor assembly 10 also includes a stationary tube 35 arranged co-axially in the center of the rotor core 12. The inner surface 36 of the shaft 16 and an outer surface 37 of the stationary tube 35 provide a rotor inner bore 38 for out flow of cooling fluid. In one embodiment, the stationary tube 35 is a hollow tube with a centre bore 39 for allowing inflow of cooling fluid.

FIG. 2 is a cross-sectional view of a stator assembly 40 of the IPM machine in FIG. 1 with a stator core 42. As illustrated herein, the stator core includes multiple segmented stator structures 44 and multiple stator teeth 46 arranged circumferentially forming a cavity 48 at a center 50 of the stator core 42. The stator assembly 40 generates a magnetic field and extends along the longitudinal axis 14 (shown in FIG. 1) with an inner surface 52 defining the cavity 48. The rotor assembly 10, as discussed above, is disposed within the cavity 48 defined by the stator core 42. The stator assembly 40 includes multiple stator-slots 54 for concentrated windings 56 in between multiple segmented structures 44, wherein each coil is wound around one stator tooth. In one embodiment, the concentrated windings 56 include copper coils. In another embodiment, the stator assembly includes fractional-slot concentrated windings. The stator assembly 40 also includes multiple stator back irons 58.

In a particular embodiment, the multiple segmented structures 44 enables increased accessibility to a stator-slot area allowing a higher number of concentrated windings 56 of copper around the stator teeth 46 compared to a traditional stator of an IPM machine. This improves the power density of the IPM machine. Furthermore, in one embodiment, the stator assembly 40 includes a coil wound around one stator tooth indicating reduced utilization of windings in the end regions of each of the stator teeth 46 compared to a traditional IPM machine. This further improves power density and efficiency.

Figure 3:
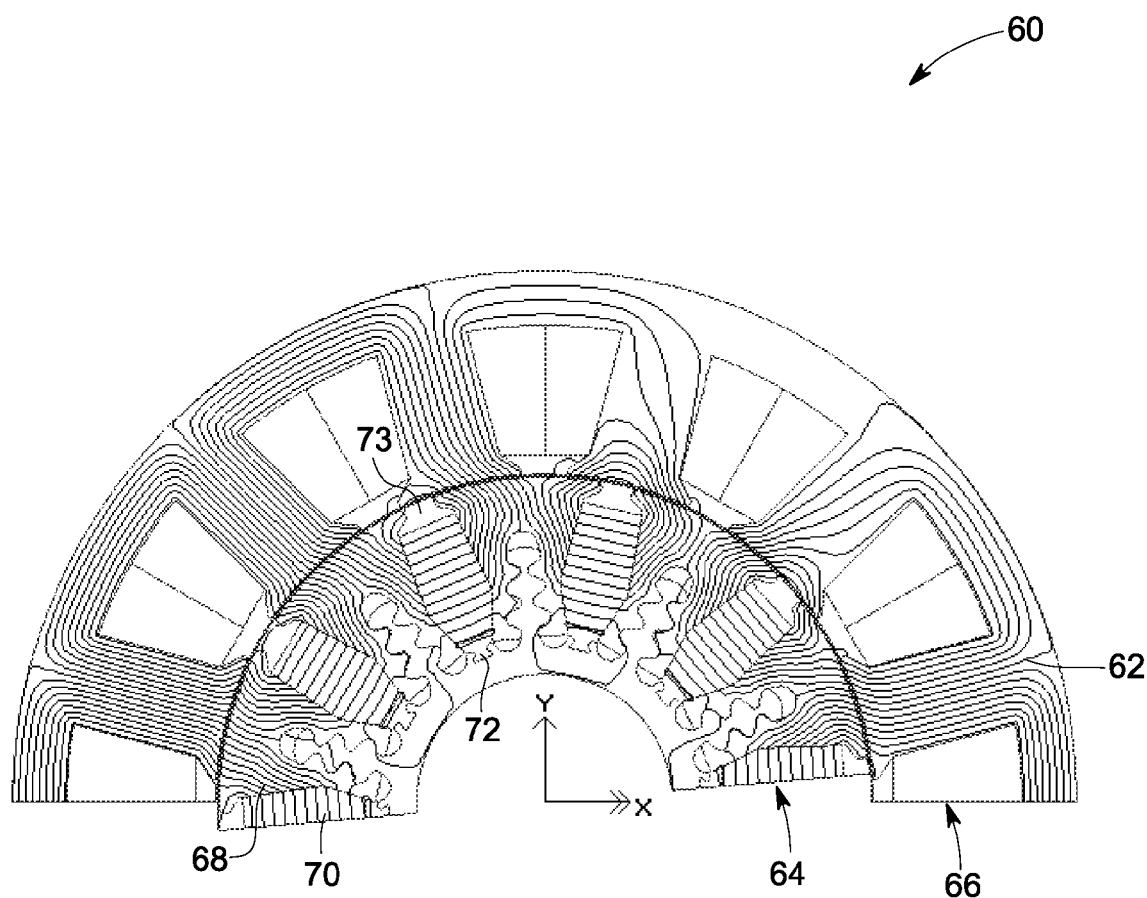
FIG. 3 is a semi-cross-sectional view illustrating the magnetic flux lines of an IPM machine in accordance with an exemplary embodiment of the invention.

FIG. 3 is a semi-cross-sectional view of the IPM machine 60 (FIG. 1 and FIG. 2) illustrating an exemplary distribution of magnetic flux lines 62 in accordance with an embodiment of the invention. In the illustrated embodiment, magnetic flux lines 62 have a continuous flow from a rotor 64 to a stator 66 region. As illustrated herein, a dovetail spoke configuration of a stack of laminations 68 and permanent magnets 70 provides for superior magnetic flux-concentration effects, thereby enhancing the machine power density of the IPM machine 60. The bottom wedges 72 are preferably non-metallic and do not allow the flow of magnetic flux lines through them, thereby preventing magnetic flux leakages. Similarly, the top wedges 73 are also preferably non-metallic and prevents the flow of magnetic flux lines 62 through them, thereby avoiding magnetic flux leakages. The flow of magnetic flux lines 62 (as shown in FIG. 3) through various areas of the IPM cross-section are based on Finite Element Analysis (FEA). In one embodiment, multiple top wedges 73 and multiple bottom wedges 72 are provided on the laterally opposite ends of multiple permanent magnets 70. The non-metallic top wedges 73 and bottom wedges 72 serve to obstruct the flow of magnetic flux lines 62 and thereby assure that the magnetic flux lines 62 exits from the permanent magnets 70 and couple with the stator windings substantially without leakage.

Figure 4:
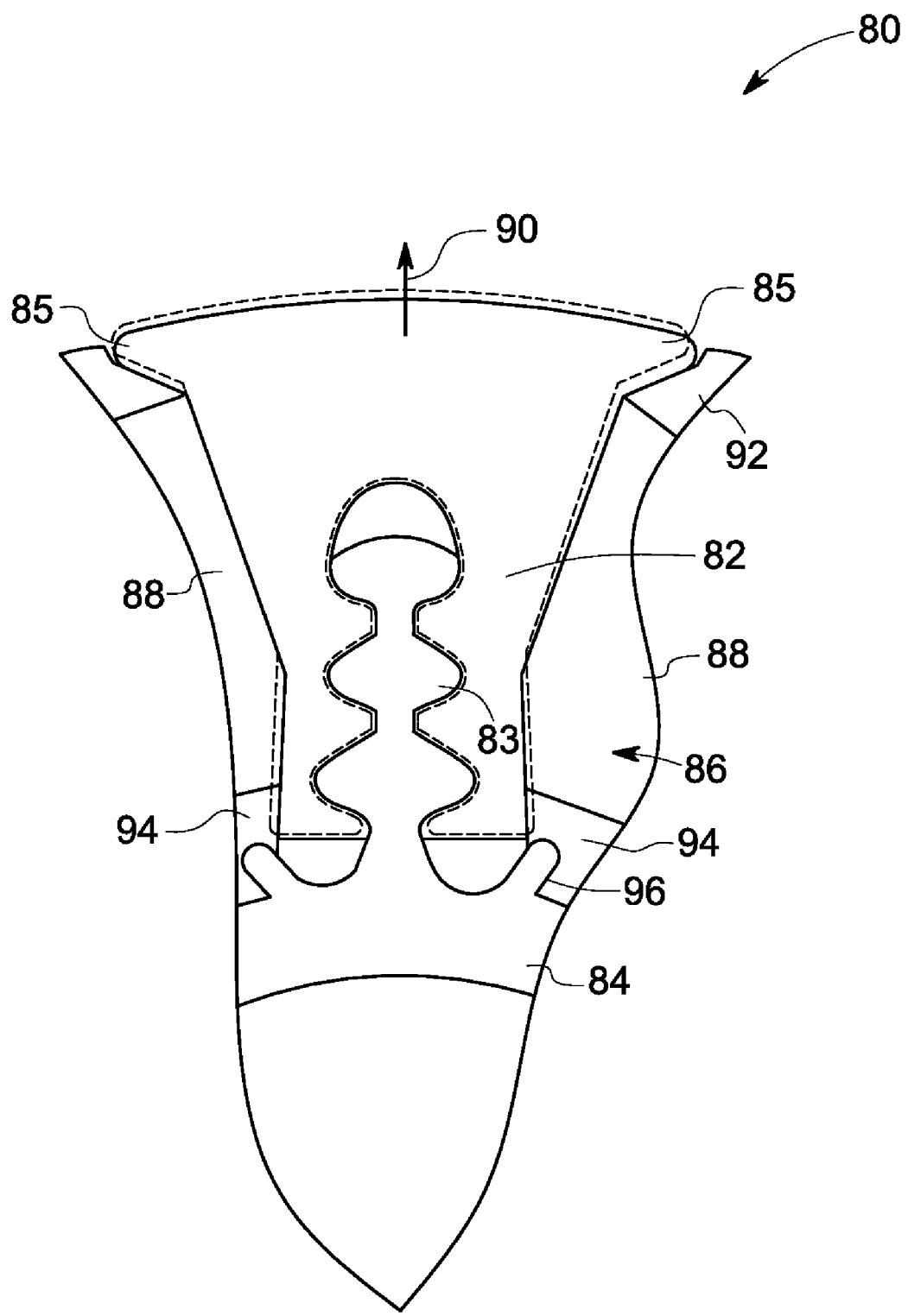
FIG. 4 is a partial cross-sectional view of a rotor assembly of an IPM machine in accordance with an exemplary embodiment of the invention.

FIG. 4 is a partial cross-sectional view of an exemplary rotor assembly 80. The rotor assembly 80 includes multiple stacks of laminations 82 disposed on the protrusions 83 of the shaft 84. As illustrated herein, the stacks of laminations 82 are dovetailed circumferentially around the shaft 84. The dovetailed recess 86 between the stacks of laminations 82 receives multiple permanent magnets 88, thereby, enabling the permanent magnets 88 to be held radially between the stacks against centrifugal force 90 caused by rotation. Further, in a particular embodiment, the rotor assembly 80 is provided with multiple top wedges 92 covering the outer periphery of the rotor assembly 80 to positively restrain the permanent magnets 88. Furthermore, each lamination is provided with lip-shaped features 85 which partially covers the top wedges 92. This also ensures the permanent magnets 88 to be firmly held in the dovetail recess 86 of the rotor assembly 80.

In one embodiment, the rotor assembly 80 is provided with multiple bottom wedges 94 disposed on multiple bottom structures 96 of the shaft 84. In a preferred embodiment, the bottom wedges 94 are non-metallic and prevent magnetic flux leakages, thereby further reducing eddy current losses. In yet another embodiment, the bottom wedges 94 and the bottom structures 96 are configured such that a portion of the bottom wedges 94 lies in the dovetailed recess between the stacks of laminations 82 beneath the multiple permanent magnets 88. This prevents splaying of the multiple stacks of laminations 82 which is a consequence of the centrifugal forces acting upon the inclined faces of the "dovetail" feature in the laminations 82 and protrusions 83. Earlier designs have relied on the permanent magnets 88 to prevent the splaying. However, since the permanent magnets 88 have a tendency to fracture, the permanent magnets 88 do not restrain the splaying reliably and results in high mechanical stresses in the laminations 82.

Figure 5:
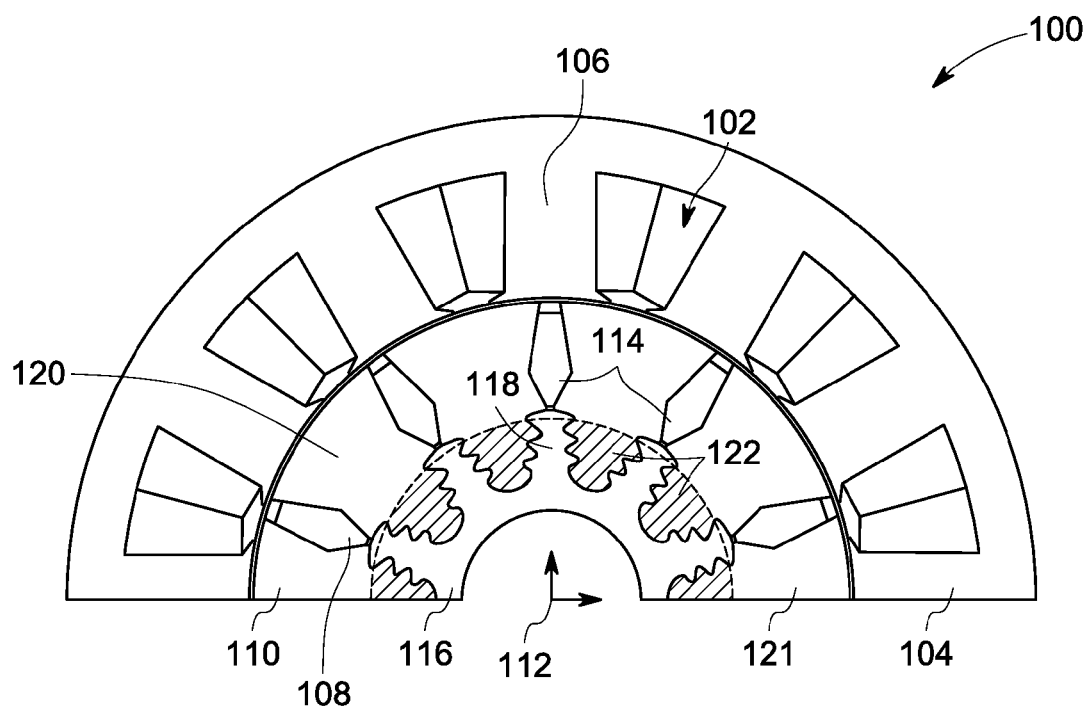
FIG. 5 is a semi-cross-sectional view of an IPM machine in accordance with another embodiment of the invention.

FIG. 5 illustrates another exemplary embodiment of an IPM machine 100. The IPM machine 100 includes a stator assembly 102 and a stator core 104. The stator core 104 also includes multiple stator teeth 106. The stator assembly 102 is further configured with stator windings to generate a magnetic field when excited with alternating currents and extends along a longitudinal axis 112 with an inner surface defining a cavity. The IPM machine also includes a rotor assembly 108 and a rotor core 110. The rotor core 110 is disposed inside the cavity formed by the stator core 104. The rotor assembly 108 is configured to rotate about the longitudinal axis 112. The rotor assembly 108 includes multiple permanent magnets 114 disposed between the stacks, which permanent magnets 114 are configured to generate magnetic field. This magnetic field interacts with the stator magnetic field to produce torque. The rotor assembly 108 further includes a shaft 116 with multiple protrusions 118. The rotor assembly 108 also includes multiple stacks of laminations 120 disposed on the protrusions 118 and dovetailed circumferentially around the shaft 116. The stacks of laminations 120 are disposed around the shaft 116 in a reverse manner compared to the previous embodiment. The laminations 120 are dovetailed around the shaft 116 between the protrusions 118 providing for a lower radii shaft compared to that of the previous embodiment. The lower radii shaft also have lesser volume and mass, as compared to that of previous embodiment, which substantially adds to the lightweight characteristic of the IPM machine 100. Further, since the laminations 120 are dovetailed around the shaft 116 between the protrusions 118, the splaying of laminations does not exist in this embodiment and hence lowers the stresses in the laminations 120.

The stacks of laminations 120 as shown in FIG. 5 further include multiple magnetic regions 121 and non-magnetic regions 122. The lower portions of the laminations 120 are heat treated for imparting non-magnetic characteristics, thereby forming the non-magnetic regions 122. Further, the non-magnetic regions 122 are dovetailed circumferentially around the shaft in a reverse manner as compared to the previous embodiment. Thus, the magnetic flux leakages in the non-magnetic region 122 are substantially reduced.

Figure 6:
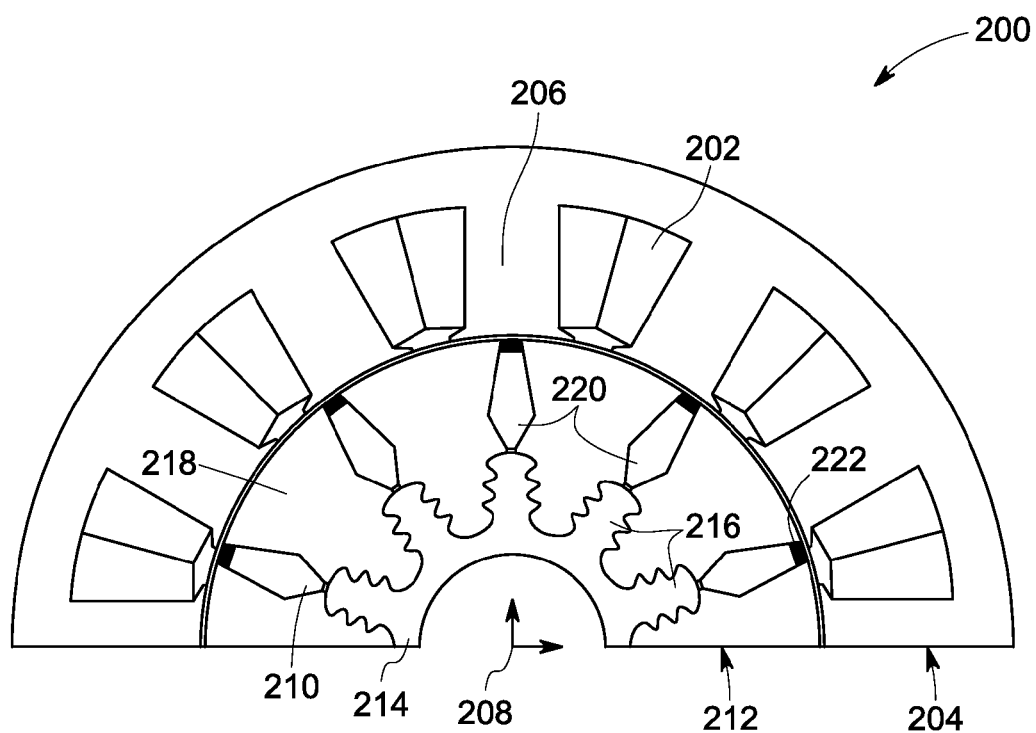
FIG. 6 is a semi-cross-sectional view of an IPM machine in accordance with yet another embodiment of the invention.

FIG. 6 illustrates a semi-cross-sectional view of another exemplary IPM machine 200. The IPM machine 200 includes a stator assembly 202 and a stator core 204. The stator core 204 also includes multiple stator teeth 206. The stator assembly 202 is further configured with stator windings to generate a magnetic field when excited with alternating currents and extends along a longitudinal axis 208 with an inner surface defining a cavity. The IPM machine 200 also includes a rotor assembly 210 and a rotor core 212. The rotor core 212 is disposed inside the cavity and configured to rotate about the longitudinal axis 208. The rotor assembly 210 further includes a shaft 214 with multiple protrusions 216. The rotor assembly 210 also includes multiple stacks of laminations 218 disposed on the protrusions 216 and dovetailed circumferentially around the shaft 214. In one particular embodiment, the laminations 218 may be heat-treated to provide continuous laminations of a bi-state magnetic material. Non-limiting examples of the bi-state magnetic material include dual phase ferromagnetic material with a composition of Iron (Fe), 17.5% Chromium (Cr), 2% Nickel (Ni), 0.8% Aluminum (Al), 0.5% Carbon (C). In other non-limiting example of dual phase ferromagnetic material, Cobalt is added to increase the magnetization. In yet another non-limiting example of dual phase ferromagnetic material, chromium may be replaced by weaker carbide forms, such as Mn. This increases the magnetization and further reduces the thermal gradient required to create the dual-phase structure. In another embodiment, the laminated 218 are subjected to a localized surface treatment to form the non-ferromagnetic regions. The rotor assembly 210 includes multiple permanent magnets 220 disposed between the stacks of laminations 218, which permanent magnets 220 are configured to generate a magnetic field that interacts with the stator magnetic field to produce a torque. In a particular embodiment, the rotor assembly 210 includes a stack of continuous laminations 218 of bi-state magnetic materials. Multiple locations 222 of the laminations 218 (as shown in FIG. 6) cover the outer periphery of the rotor assembly 210 to restrain the multiple permanent magnets 220 against the centrifugal force. Further, the multiple locations 222 are made non-magnetic by heat-treating to reduce the magnetic flux leakages. The non-magnetic regions obstruct the flow of magnetic flux and thereby assure that the magnetic flux exits from the permanent magnets 220 without leakage.

Figure 7:
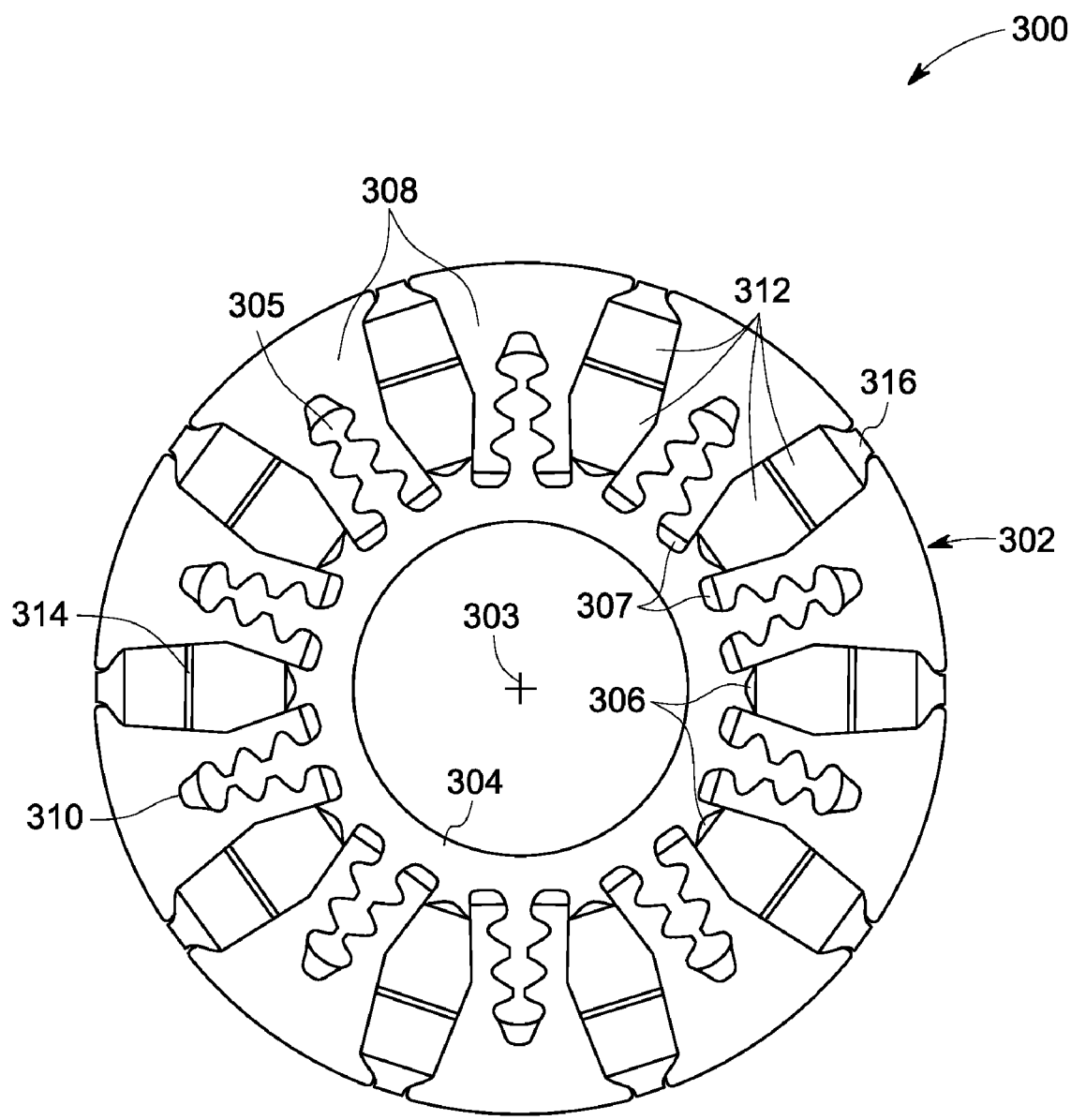
FIG. 7 is a cross-sectional view of a rotor assembly of an IPM machine in accordance with another exemplary embodiment of the invention.

FIG. 7 illustrates a cross-sectional view of a rotor assembly 300 of yet another exemplary IPM machine. The rotor assembly 300 includes a rotor core 302. The rotor core 302 is configured to rotate about a longitudinal axis 303 of the IPM machine. The rotor assembly 300 further includes a shaft 304 with multiple protrusions 305 around the rotor core 302. In the illustrated embodiment, the shaft 304 also includes multiple bottom features 306 alternatively arranged relative to the multiple protrusions 305. In a particular embodiment, the bottom structures 306 are configured to provide passages 307 for a cooling fluid (not shown) within the rotor core 302. In another embodiment, the bottom structures 306 are configured to provide spaces for airflow or a coolant. In a non-limiting example, the cooling fluid through the passages 307 may be airflow or a coolant for reducing mechanical stresses and eddy current losses in the rotor assembly 300. The rotor assembly 300 also includes multiple stacks of laminations 308 disposed on the protrusions 305 and dovetailed circumferentially around the shaft 304. In one embodiment, the stacks of laminations 308 and the protrusions 305 of the shaft 304 are configured to provide multiple shaft top features 310 with spaces or passages for allowing flow of a cooling fluid. In other embodiments, the shaft top features 310 may reduce mechanical stresses and eddy current losses of the rotor assembly 300. The shaft top features 310 also result in overall mass reduction of the rotor assembly 300. Further, the rotor assembly 300 includes multiple pair of permanent magnets 312 disposed between the stacks of laminations 308 within the rotor core 302. The pair of permanent magnets 312 are further separated by multiple middle wedges 314 mounted between each pair of permanent magnets 312. The inclusion of middle wedges 314 provides robustness to the rotor assembly 300 and further provides substantial strength to the permanent magnets 312. In one embodiment, the rotor assembly 300 may also be provided with multiple top wedges 316 covering the outer periphery of the rotor assembly 300 to restrain the permanent magnets 312 against centrifugal forces.

The pair of permanent magnets 312 is configured to generate a magnetic torque by providing a magnetic field that interacts with a stator magnetic field and is radially directed in an air gap between the rotor and the stator. The pair of permanent magnets 312 provides an arrangement, which is a dovetail spoke configuration, particularly well suited for high-speed applications. The dovetail spoke configuration provides for superior magnetic flux-concentration effects, thereby enhancing the machine power density. In one embodiment, the permanent magnets 312 may be made of neodymium-boron-iron. In another embodiment, the permanent magnets 312 may be made of samarium-cobalt, or ferrite, or Alnico.

Figure 8:
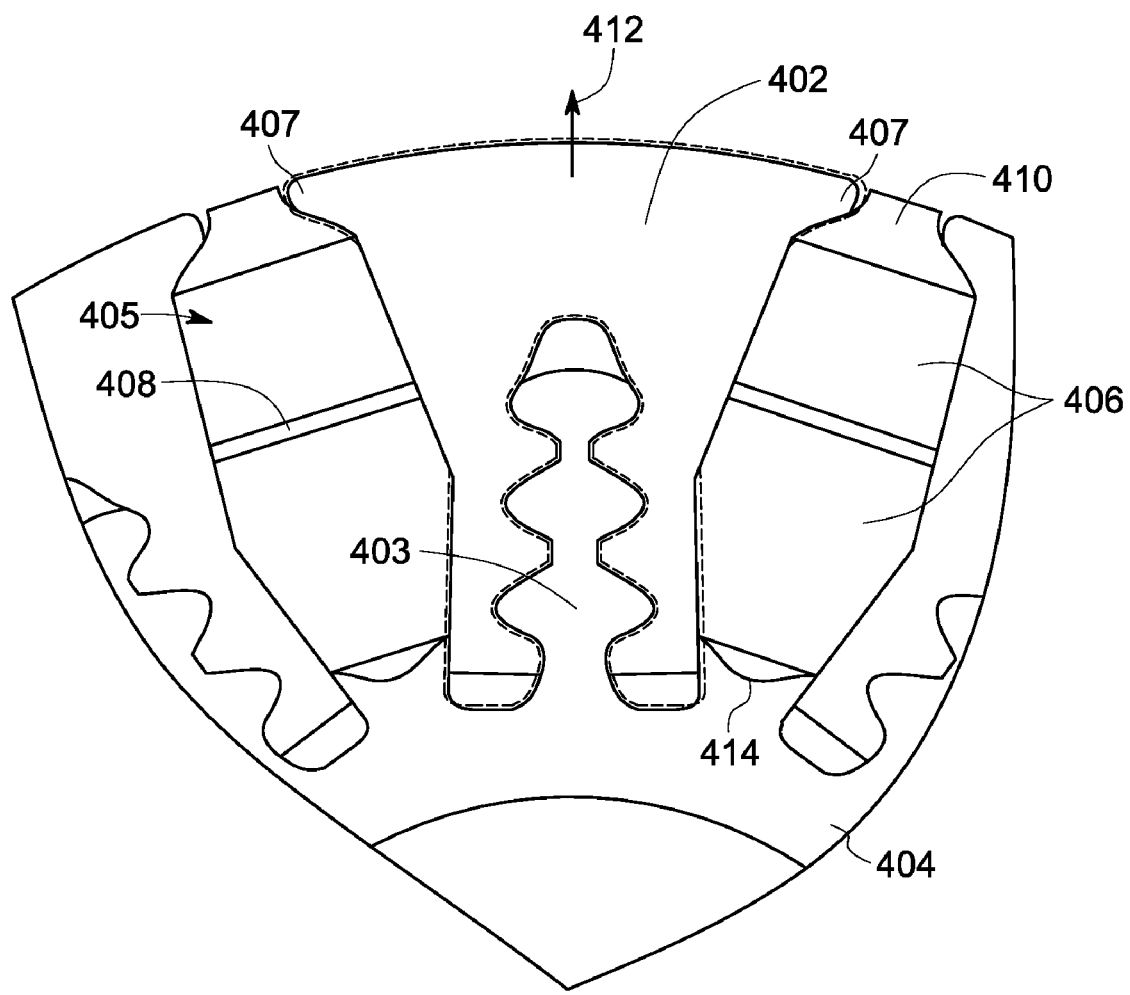
FIG. 8 is a partial cross-sectional view of a rotor assembly of an IPM machine in accordance with another exemplary embodiment of the invention.

FIG. 8 is a partial cross-sectional view of the rotor assembly 300 in FIG. 7. The rotor assembly 300 includes multiple stacks of laminations 402 disposed on the protrusions 403 of the shaft 404. As illustrated herein, the stacks of laminations 402 are dovetailed circumferentially around the shaft 404. The dovetailed recess 405 between the stacks of laminations 402 receives multiple pair of permanent magnets 406, thereby; enabling the pair of permanent magnets 406 to be held radially between the stacks 402 against centrifugal forces 412. The pair of permanent magnets 406 are further separated by multiple middle wedges 408 mounted between each pair of permanent magnets 406. The middle wedges 408 prevents splaying of the laminations 402 in the middle region, thereby further preventing stresses in the laminations as well on the permanent magnets 406. The inclusion of middle wedges 408 provides robustness to the rotor assembly and further provides substantial strength to the permanent magnets 406. Further, in a particular embodiment, the rotor assembly 300 of FIG. 7 is provided with multiple top wedges 410 covering the outer periphery of the rotor assembly 300 to restrain the permanent magnets 406 against the centrifugal forces 412. Furthermore, each lamination is provided with lip-shaped features 407 which partially covers the top wedges 410. This also ensures the permanent magnets 406 to be firmly held in the dovetail recess 405 of the rotor assembly 300.

In another embodiment, the shaft 404 is provided with multiple bottom structures 414 alternately arranged relative to multiple shaft protrusions 403. The bottom structures 414 are arranged to substantially prevent splaying of the multiple stacks of laminations 402 under high-speed rotations. The centrifugal forces 412 acting upon the inclined faces of the "dovetail" feature in the laminations 402 and protrusions 403, causes splaying of the laminations which is substantially prevented by multiple edges of the bottom structures 414 as shown in FIG. 8.

Figure 9:
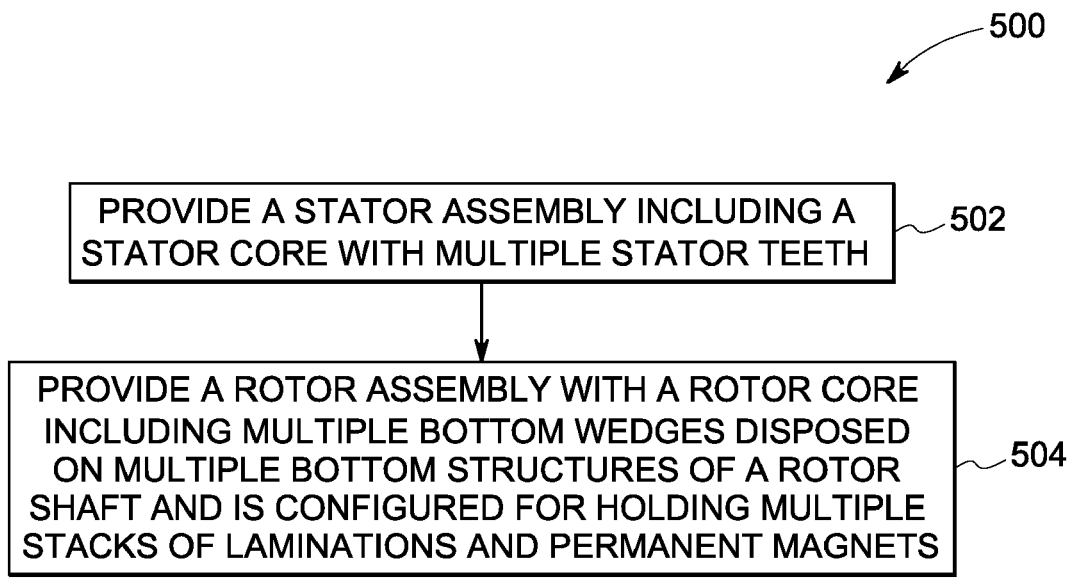
FIG. 9 is a flow chart representing steps in a method for assembling an IPM machine.

FIG. 9 is a flow chart representing steps in a method 500 for assembling an IPM machine. The method 500 includes providing a stator assembly including a stator core with multiple stator teeth in step 502. The stator assembly extends along a longitudinal axis with an inner surface defining a cavity. The stator assembly is further configured with stator windings to generate a stator magnetic field when excited with alternating currents. At step 504, the method 500 includes providing a rotor assembly with a rotor core including multiple bottom wedges disposed on multiple bottom structures of a rotor shaft and is configured for holding multiple stacks of laminations and permanent magnets. The rotor core of the IPM machine is disposed inside the cavity formed by the stator core and is configured to rotate about the longitudinal axis. The rotor shaft includes multiple protrusions alternately arranged relative to the bottom structures around the shaft. The stacks of laminations are disposed on the protrusions and dovetailed circumferentially around the shaft. Furthermore, the multiple permanent magnets are disposed between the stacks and configured to generate a magnetic field, which magnetic field interacts with the stator magnetic field to produce a torque. In a particular embodiment, the method also includes providing multiple top wedges mounted on the multiple permanent magnets for containing the multiple permanent magnets.

Figure 10:
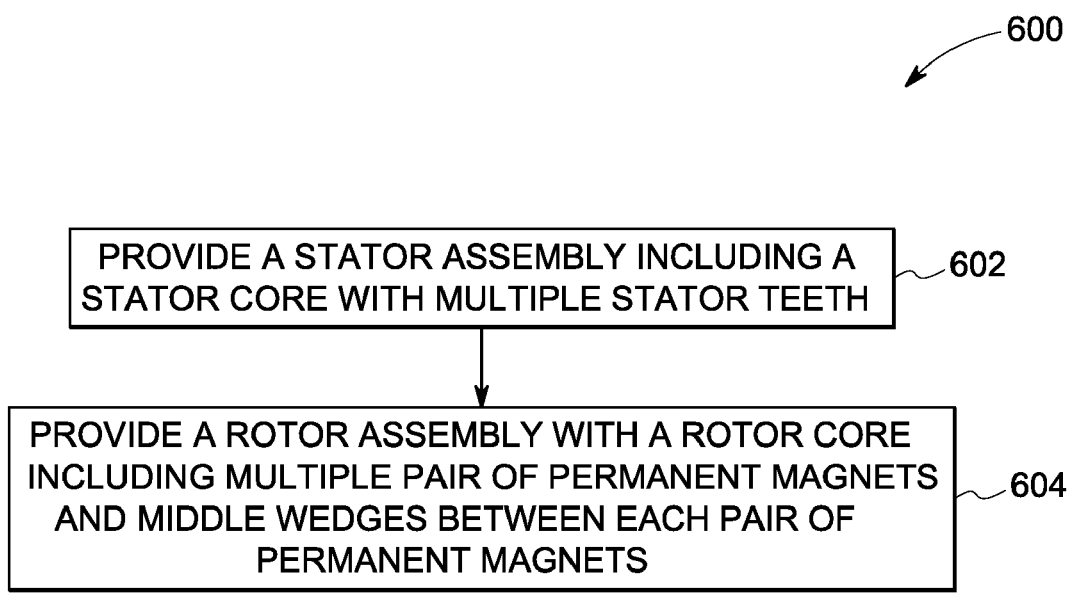
FIG. 10 is a flow chart representing steps in another method for assembling an IPM machine.

FIG. 10 is a flow chart representing steps in another method 600 for assembling an IPM machine. The method 600 includes providing a stator assembly including a stator core with multiple stator teeth in step 602. The stator assembly extends along a longitudinal axis with an inner surface defining a cavity. The stator assembly is further configured with stator windings to generate a magnetic field when excited with alternating currents. At step 604, the method 600 includes providing a rotor assembly with a rotor core including multiple pair of permanent magnets and middle wedges between each pair of permanent magnets. The permanent magnets are configured to generate a magnetic field, which interacts with the stator magnetic field to produce a torque. The rotor core of the IPM machine is disposed inside the cavity formed by the stator core and is configured to rotate about the longitudinal axis. The rotor shaft includes multiple protrusions alternately arranged relative to the bottom structures around the shaft. The stacks of laminations are disposed on the protrusions and dovetailed circumferentially around the shaft. Furthermore, the multiple permanent magnets are disposed between the stacks and configured to generate a magnetic field that interacts with the stator magnetic field to produce torque. In a particular embodiment, the method also includes providing multiple top wedges mounted on the multiple permanent magnets for containing the multiple permanent magnets.

Advantageously, the various embodiments of the invention decouple the electromagnetic and mechanical requirements in an IPM machine by eliminating the need for bridges and center posts. This substantially increases the machine power density. Also the spoke configuration has flux-concentration effects, which further increases the machine power density. The dovetailing of the rotor laminations into the shaft allows going to higher tip speeds (rotor outer radius speed), which further increases the machine power density. The lower radii shaft in one embodiment provides for a shaft with less mass and further adding to a lightweight characteristic of the IPM machine. Other advantages of the invention include the reduction of the magnetic flux due to the bi-state laminations and non-metallic or non-magnetic wedges. The rotor assembly and the various associated components are primarily configured to provide maximum power density and minimum eddy current losses. Furthermore, the present invention provides additional advantages in terms of low volume, mass and cost. These techniques and systems thus, allow for highly efficient permanent magnet machines.

The IPM machines, as described above, may be well suited for hybrid applications. However, such IPM machines may be employed in a variety of other applications. One of them includes aviation applications, such as in aircraft engines. The PM machines can also be used for other non-limiting examples such as traction applications, wind and gas turbines, starter-generators for aerospace applications, industrial applications and appliances.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An internal permanent magnet machine comprising:
   a stator assembly comprising a stator core, the stator core comprising a plurality of stator teeth, the stator assembly is further configured with stator windings to generate a stator magnetic field when excited with alternating currents and extends along a longitudinal axis with an inner surface defining a cavity; and
   a rotor assembly comprising a rotor core, the rotor assembly disposed inside said cavity and configured to rotate about the longitudinal axis, wherein the rotor assembly comprises:
   a shaft comprising a plurality of protrusions alternately arranged relative to a plurality of bottom structures;
   a plurality of stacks of laminations, the stacks disposed on the protrusions and dovetailed circumferentially around the shaft;
   a plurality of a pair of permanent magnets for generating a magnetic field, which magnetic field interacts with the stator magnetic field to produce a torque;
   each pair of permanent magnets disposed between the stacks of laminations; and
   a plurality of middle wedges mounted between each pair of permanent magnets; wherein the plurality of stacks of laminations, the pair of permanent magnets, and the plurality of middle wedges extend along an entire axial length of the shaft.

2. The machine according to claim 1, further comprising a plurality of top wedges mounted on the plurality of permanent magnets for containing the plurality of permanent magnets.

3. The machine according to claim 2, wherein the plurality of top wedges comprise non-metallic wedges.

4. The machine according to claim 1, wherein the plurality of middle wedges comprise non-metallic wedges.

5. The machine according to claim 2, wherein the laminations comprises lip-shaped features configured to be seated partially on the top wedges.

6. The machine according to claim 1, wherein the bottom structures of the shaft are configured to prevent splaying of the plurality of the stacks of laminations.

7. The machine according to claim 1, wherein the bottom structures are configured to reduce mechanical stress generated in the magnets and stacks of laminations.

8. The machine according to claim 1, wherein the bottom structures are configured to reduce eddy current losses in the rotor assembly.

9. The machine according to claim 1, wherein the bottom structures are configured to provide a passage for a cooling fluid.

10. The machine according to claim 1, wherein the plurality of protrusions and the plurality of stacks of rotor laminations are configured to provide a passage for a cooling fluid.

11. The machine according to claim 1, wherein the cooling fluid comprises ambient air or a coolant.

12. The machine according to claim 1, further comprising a stationary tube within the shaft, wherein the passage inside the tube provides for in flow of a coolant.

13. The machine according to claim 12, wherein the passage between the shaft and the tube provides for out flow of the coolant.

14. A method for assembling an internal permanent magnet machine, the method comprising:
    providing a stator assembly comprising a stator core, the stator core comprising a plurality of stator teeth, the stator assembly is further configured with stator windings to generate a stator magnetic field when excited with alternating currents and extending along a longitudinal axis with an inner surface defining a cavity; and
    providing a rotor assembly comprising a rotor core, the rotor assembly disposed inside said cavity and configured to rotate about the longitudinal axis, wherein the rotor assembly comprises:
    a shaft comprising a plurality of protrusions alternately arranged relative to a plurality of bottom structures;
    a plurality of stacks of laminations, the stacks disposed on the protrusions and dovetailed circumferentially around the shaft;
    a plurality of a pair of permanent magnets for generating a magnetic field, which magnetic field interacts with the stator magnetic field to produce a torque;
    each pair of permanent magnets disposed between the stacks of rotor laminations;
    a plurality of middle wedges mounted between each of the pair of permanent magnets; wherein the plurality of stacks of laminations, the pair of permanent magnets, and the plurality of middle wedges extend along an entire axial length of the shaft; and
    a plurality of top wedges mounted on the plurality of permanent magnets for containing the plurality of permanent magnets.

* * * * *